United States Patent
Raghunathan et al.

(10) Patent No.: US 9,171,051 B2
(45) Date of Patent: Oct. 27, 2015

(54) DATA DEFINITION LANGUAGE (DDL) EXPRESSION ANNOTATION

(71) Applicant: Oracle International Corporation, Redwood Shores, CA (US)

(72) Inventors: Parthasarathy Elangadu Raghunathan, Karnataka (IN); Lik Wong, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 119 days.

(21) Appl. No.: 13/949,969

(22) Filed: Jul. 24, 2013

(65) Prior Publication Data

US 2015/0032689 A1    Jan. 29, 2015

(51) Int. Cl.
*G06F 17/30* (2006.01)
(52) U.S. Cl.
CPC ............... *G06F 17/30575* (2013.01)
(58) Field of Classification Search
CPC ............... G06F 17/30; G06F 17/00
USPC ............... 707/600–899
See application file for complete search history.

(56) References Cited

U.S. PATENT DOCUMENTS

2012/0246179 A1* 9/2012 Garza et al. ............... 707/752

* cited by examiner

*Primary Examiner* — Isaac M Woo
(74) *Attorney, Agent, or Firm* — Hickman Palermo Becker Bingham LLP (57) ABSTRACT

Techniques are provided for data definition language (DDL) expression annotation. DDL expression text is captured. The DDL expression text corresponds to a DDL change in a source database. A component set is determined. The component set includes at least one component in the DDL expression text. An annotation set is generated. The annotation set includes at least one annotation for at least one component of the component set. Each annotation includes hierarchical data describing at least one hierarchical relationship in the component set. For example, an annotation may include a component ID, a component position, a component length, a component type, and a parent component ID. The annotation set and a change record comprising the DDL expression text are transmitted to a replication client.

20 Claims, 5 Drawing Sheets

DATA DEFINITION LANGUAGE (DDL) EXPRESSION ANNOTATION

TECHNICAL FIELD

The present disclosure generally relates to computer systems, and, more specifically, to data definition language ("DDL") expression annotation.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computers systems may be configured to store and retrieve large amounts of data. Typically, computer systems rely on database systems to perform this function. Data may be shared across multiple databases. Replication is the process of replicating data from a source database onto another database system, herein referred to as a target database. One approach to replication is the physical replication approach. Under the physical replication approach, the changes made to data blocks on the source database are made to replicas of those data blocks on a target database. Because the source database is replicated at the lowest atomic level of storage space on the target database, the target database is a physical replica of the source database. Another approach to replicating data is the logical replication approach. Under the logical replication approach, database commands that modify data on the source database are re-executed on the target database. While executing the same database commands guarantees that changes are replicated at the record level, the changes are not replicated at the data block level.

Under the logical replication approach, the target database does not need to have the same underlying database structure as the source database. For example, the target database may define different database structures than the source database, such as tables, views, and/or complex data types. Furthermore, not all changes made on the source database need to be made on the target database. For example, replication may be carried out for a subset of changes made on a source database.

To access or modify data stored in a database, applications interact with a database server by submitting database commands that cause the database server to perform operations on data stored in a database. A database command may conform to a syntax of a database language. One language for expressing database commands is Structured Query Language ("SQL"). SQL includes data manipulation language ("DML") instructions and data definition language ("DDL") instructions. DML instructions are used to manage data stored in database structures, such as tables, views, or complex data types, and other database objects. DDL instructions are used to define and modify database structures.

Mapping and filtering of database commands is useful when data is logically shared between databases that do not share the same underlying database structure and/or when only a subset of changes are to be replicated between a source database and a target database. The mapping and filtering of DML instructions is straightforward because DML instructions only act on one database object, such as a database table. However, this is not true for the mapping and filtering of DDL instructions. Complexities arise with mapping and/or filtering DDL instructions because of multiple reasons. For example, DDL instructions may involve multiple database objects, may affect multiple system tables, and may be dependent on the executing environment.

When processing replication data for DDL from a source database system, target database systems may attempt to compensate for these complexities by parsing the DDL text. For example, rudimentary mapping may be performed by replacing schema and object names present in the DDL text based on a text search and replace, but errors may arise when the same object or schema name is used for different database objects also present in the same DDL text. However, such parsing methods are error-prone because the target system may not know the exact grammar of the DDL being parsed and hence cannot be used for fine-grained mapping or filtering.

Based on the foregoing, it is desirable to develop an approach for data definition language ("DDL") expression annotation.

DESCRIPTION OF EXAMPLE EMBODIMENTS

DDL expression annotation is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1. General Overview

Techniques are described for DDL expression annotation. In replication, mapping and filtering of replication data is useful when data is logically shared between databases. To prepare DDL replication data for mapping and filtering at the target, an annotated DDL change record is generated at the source. The annotated DDL change records include the original expression as well as an annotation set. The annotation set includes information about one or more components of the DDL expression. For example, the components may be selected from schema names, object names, column names, table space names, partition names, or any other database object type. These components have a hierarchical relationship in the source database that may be reflected in the annotations.

In this manner, necessary information at the source database server is transferred to the target database server such that fine-grained mapping and filtering may be performed. The annotation set addresses several properties of DDL instructions. Unlike DML instructions, DDL instructions may involve many database objects. Furthermore, the effects of a DDL instruction executed by a source database server may be scattered across many system tables, which are not typically replicated at the target database server. The effects of a DDL instruction may also depend on the executing environment and/or environment variables, which may differ between the source database server and the target database server. The source database server may also automatically create object names, such as constraint names, which are unknown to the target database server. Additionally, DDL grammar structure for interpreting DDL expressions may differ between different database systems.

2. Database Management Systems

Embodiments described herein may be used in the context of database management systems (DBMSs). A DBMS manages a database. A DBMS may comprise one or more database servers. A database comprises database data and a database dictionary that are stored on a persistent memory mechanism, such as a set of hard disks. A database dictionary comprises metadata that defines database objects physically or logically contained in a database. In effect, a database dictionary defines the totality of a database. Database objects include tables, indexes, views, columns, data types, users, user privileges, and storage structures, such as tablespaces, which are used for storing database object data.

Database data may be stored in one or more data containers, each containing one or more records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use other terminology.

Users interact with a database server of a DBMS by submitting commands that cause the database server to perform operations on data stored in a database. A user may be one or more applications running on a client that interact with a database server.

A database command may be in the form of a database statement that conforms to a syntax of a database language. One example language for expressing database commands is Structured Query Language (SQL). SQL data manipulation language ("DML") instructions are issued to a DBMS to manage data stored within a database structure. For instance, SELECT, INSERT, UPDATE, and DELETE are common examples of DML instructions found in some SQL implementations.

SQL data definition language ("DDL") instructions are issued to a DBMS to define database structures such as tables, views, or complex data types. For instance, CREATE, ALTER, DROP, and RENAME, are common examples of DDL instructions found in some SQL implementations. DDL instructions may also be used to grant and revoke privileges and roles (e.g. GRANT, REVOKE), analyze information on a table, index or cluster (e.g. ANALYZE), and to establish auditing options (e.g. COMMENT). These DDL instructions are examples selected from many available DDL instructions available in one or more DBMS.

Although the examples described above are based on Oracle's SQL, the techniques provided herein are not limited to Oracle's SQL, to any proprietary form of SQL, to any standardized version or form of SQL (ANSI standard),or to any particular form of database command or database language. Furthermore, for the purpose of simplifying the explanations contained herein, database commands or other forms of computer instructions may be described as performing an action, such as creating tables, modifying data, and setting session parameters. However, it should be understood that the database command itself performs no actions, but rather the DBMS, upon executing the database command, performs the corresponding actions. Typically, database commands are executed over a synchronous connection to the database.

3. Mapping and Filtering

In replication, mapping and filtering of replication data is useful when data is logically shared between databases, including databases that do not share the same underlying database structure. For replication data corresponding to DML instructions, mapping allows data stored in source database objects to be replicated in target database objects. For replication data corresponding to DDL instructions, mapping allows changes to source database object types to be made to target database object types. Replication data corresponding to DML and/or DDL instructions may also be filtered. For example, filtering is useful when only a subset of changes is replicated between a source database and a target database.

The mapping and filtering of replication data corresponding to DML instructions is straightforward because DML instructions only act on one database object, such as tables, views, columns, and data typesused for storing database object data. The DML instructions typically include old and/or new data values that be used for mapping and filtering. These properties make mapping and filtering of DML instructions straightforward.

On the other hand, mapping and filtering replication data corresponding to DDL instructions may involve many database objects. For example, the CREATE TABLE [AS] SELECT instruction may involve target and dependent objects. Furthermore, the effects of a DDL instruction executed by a source database server may be scattered across many system tables. System tables are not typically replicated at the target database server. The effects of a DDL instruction may also depend on the executing environment and/or environment variables that may differ between the source database server and the target database server. The source database server may also automatically create object names, such as constraint names, which are unknown to the target database server. Additionally, DDL grammar structure is required to interpret a DDL instruction and/or expression may differ between different database systems.

To address these issues, change records in the replication data that correspond to DDL instructions include the original DDL expression as well as an annotation set. In this manner, necessary information at the source database server is transferred to the target database server. The annotated change record may be parsed by a target database system, even when the target database system is different from the source database system.

The annotation set includes information about one or more components of the DDL expression. For example, the components may be selected from schema names, object names, column names, table space names, partition names, or any other database object type. The components appearing in the DDL expression have a hierarchical relationship in the source database. In one embodiment, the annotations corresponding to these components reflect the hierarchical relationship. Annotation generation and structure is described in further detail at FIG. 3.

4. Database Replication

Figure 1:
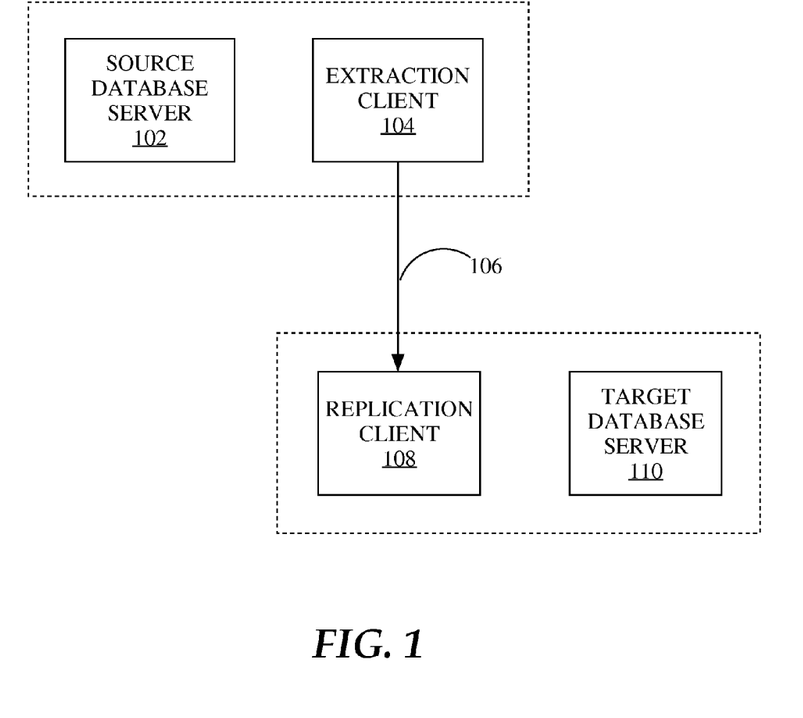
FIG. 1 is a block diagram depicting an embodiment of replication between database systems.

FIG. 1 is a block diagram depicting an embodiment of replication database systems. Source database server 102 is configured to maintain a source database. In one embodiment, source database server 102 is configured to log database changes performed on the source database, such as database commands, operations and/or transactions. For example, extraction client 104 may generate a log, structure, and/or file containing database changes.

Extraction client 104 is configured to extract replication data 106. Replication data 106 contains sufficient information to reproduce changes performed on the source database by source database server 102. For DDL expressions, extraction client 104 generates replication data that includes DDL annotations.

Extraction client 104 may access one or more logs, structures and or files generated by source database server 102. For example, extraction client 104 may process logged database changes made to the source database to extract logical replication data 106. Extraction client 104 may be a module of source database server 102 and/or may share one or more computing resources with source database server 102. Alternatively and/or in addition, extraction client 104 may communicate with source database server 102 over a network.

Replication data 106 contains change records that describe operations and/or transactions performed on the source database by source database server 102. A change record may include data showing the difference between an existing record and a new record. The change records may represent source database transactions and/or commands containing DML instructions and/or DDL instructions.

In one embodiment, replication data 106 includes all transactions performed on the source database. Replication data 106 may alternatively include a subset of transactions performed on the source database. The transactions may be in committed order. Alternatively, the transactions may include multiple interleaved transactions.

Replication data 106 may include one or more files or other data, which may be generated specifically for the purpose of replication, or alternatively generated as an audit or record file. Alternatively and/or in addition, extraction client 104 may transmit replication data 106 over a network. For example, extraction client 104 may output replication data 106 to a network location. Alternatively and/or in addition, extraction client 104 may generate a replication data stream containing replication data 106.

Replication client 108 and target database server 110 are integrated to facilitate replication on a target database maintained by target database server 110. Replication client 108 is configured to read change records contained in replication data 106 and cause one or more operations and/or transactions described in the change records to be performed on the target database by target database server 110. The change records represent source database transactions and/or commands containing DML instructions and/or DDL instructions. In one embodiment, a transaction is committed before and after every DDL statement containing DDL instructions, such that each DDL statement is in its own transaction.

In one embodiment, replication client 108 does not have direct access to the target database. However, replication client 108 may be a module of target database server 110 and/or may share one or more computing resources with target database server 110. Alternatively and/or in addition, replication client 108 may communicate with target database server 110 over a network.

Figure 2:
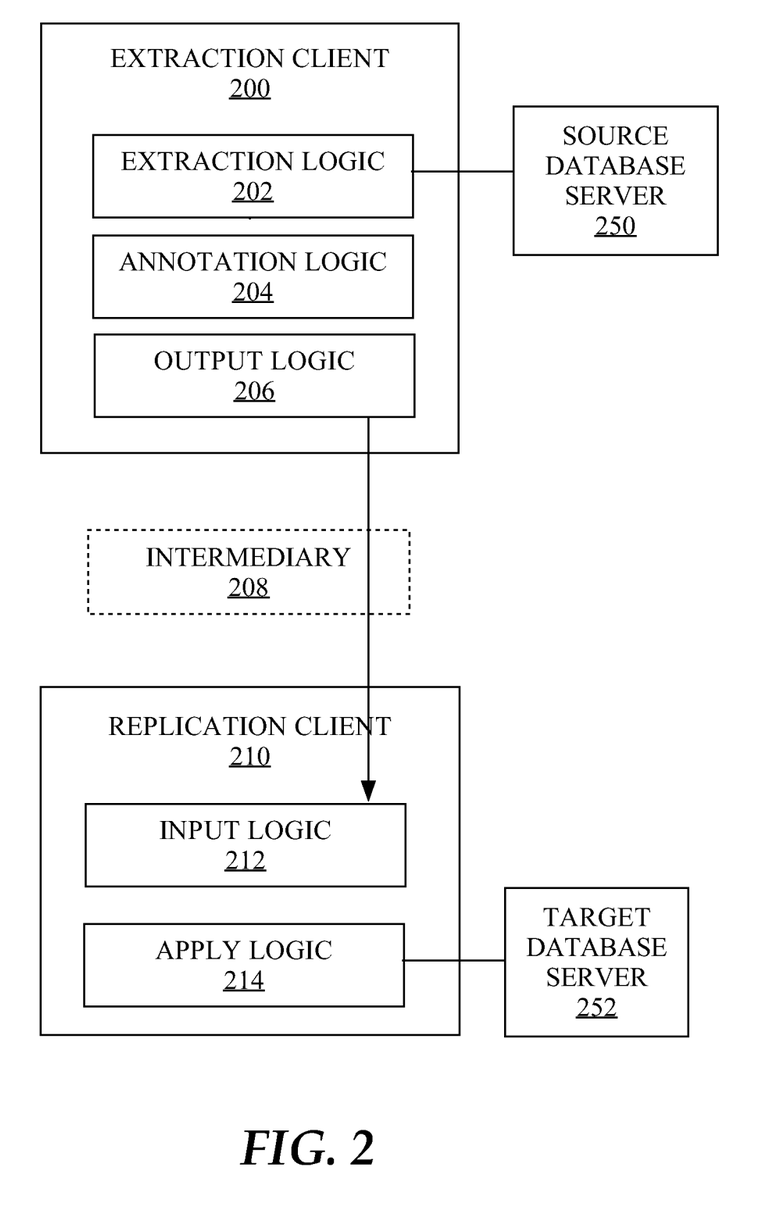
FIG. 2 is a block diagram depicting an embodiment of replication between database systems including an extraction client associated with a source database server and a replication client associated with a target database server.

FIG. 2 is a block diagram depicting an embodiment of replication between database systems including an extraction client associated with a source database server and a replication client associated with a target database server. Extraction client 200 is configured to extract replication data corresponding to database changes made to a source database by source database server 250. In one embodiment, the changes made to the source database include SQL commands executed by source database server 250, including DML instructions and DDL instructions. Extraction client 200 may be a module of source database server 250 and/or may share one or more computing resources with source database server 250. Alternatively and/or in addition, extraction client 200 may communicate with source database server 250 over a network.

Extraction logic 202 is a logical component of extraction client 200. Extraction logic 202 is configured to extract replication data containing sufficient information to reproduce actions performed on the source database by source database server 250. In one embodiment, extraction logic 202 processes database changes logged by source database server 250.

Annotation logic 204 is a logical component of extraction client 200. Annotation logic 204 is configured to annotate replication data corresponding to one or more DDL instructions. For example, annotation logic 204 may be configured to generate annotation set 304. Annotation generation is described in further detail at FIG. 3.

Output logic 206 is a logical component of extraction client 200. Output logic 206 is configured to generate output containing annotated replication data. Output logic 206 may output the annotated replication data as intermediary 208. For example, intermediary 208 may be a local file location, a network location, a storage disk location, and/or any other intermediate computer readable medium that may be transferred to or accessed by replication client 210. Alternatively and/or in addition, output logic 206 may output the annotated replication data directly to replication client 210, such as by using one or more shared computing resources and/or by communicating the replication data over a network. In one embodiment, output logic 206 outputs the annotated replication data directly to replication client 210 over a data stream as the annotated replication data is generated. The annotated replication data may be generated and streamed at the time that transactions are executed and/or committed by source database server 250.

Extraction logic 202, annotation logic 204 and output logic 206 are described as logical components of extraction client 200. These logical components may be implemented in one or more functions, routines, threads or processes. Although these logical components are described separately, two or more logical components may be implemented in the same or overlapping functions, routines, threads or processes.

Replication client 210 is configured to apply changes contained in the annotated replication data to target database server 252. The annotated replication data, generated by extraction client 200, contains sufficient information to reproduce transactions and/or commands performed on the source database by source database server 250. The annotated replication data includes annotations corresponding to one or more DDL transactions.

Input logic 212 is a logical component of replication client 210. Input logic 210 is configured to obtain and/or receive annotated replication data generated by extraction client 200. For example, input logic 212 may obtain the annotated replication data from a file, a network location, a storage disk, and/or any other intermediate computer readable medium such as intermediary 208. Alternatively and/or in addition, input logic 212 may receive the annotated replication data directly from extraction client 200, such as by using one or more shared computing resources and/or by receiving the annotated replication data over a network.

Apply logic 214 is a logical component of replication client 210. Apply logic 214 is configured to cause one or more operations and/or transactions described in the annotated replication data to be performed on the target database by target database server 252. Apply logic 214 is configured to read change records contained in the annotated replication data. Apply logic 214 may cause replication on the target database by generating one or more database commands based on the change record and any annotations. Alternatively and/or in addition, apply logic 214 may cause replication on the target database by transmitting the change record to target database server 252. Apply logic 214 may modify the change record or alternatively transmit the original change record along with any annotations.

Input logic 212 and apply logic 214 are described as logical components of replication client 210. These logical components may be implemented in one or more functions, routines, threads or processes. Although these logical components are described separately, two or more logical components may be implemented in the same or overlapping functions, routines, threads or processes.

Replication client 210 may be further configured to perform mapping and/or filtering operations. Annotated replication data may be mapped from source database server 250 to target database server 252. More specifically, one or more DDL transactions executed on source database server 250 may be mapped to target database server 252. Annotated replication data may be used to filter annotated replication data from source database server 250. More specifically, one or more DDL transactions executed on source database server 250 may be filtered. To map and filter, the annotations in the annotated replication data may be used to identify the correct database objects in the target database.

5. DDL Annotation Set

Figure 3:
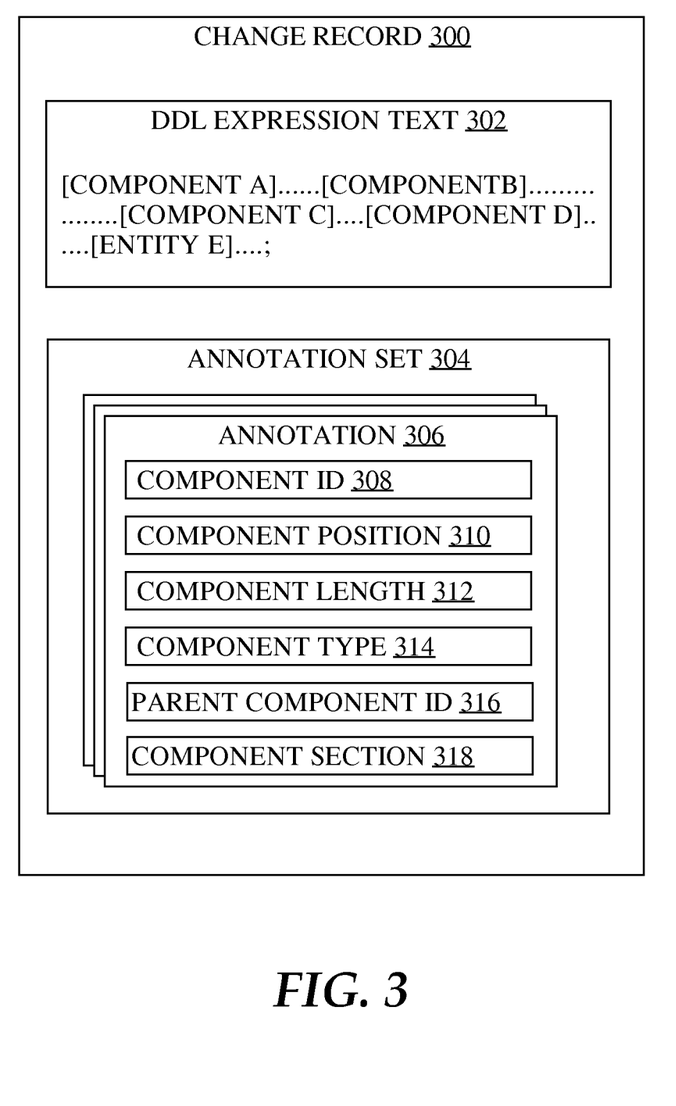
FIG. 3 is a block diagram depicting an embodiment of a change record including an annotated DDL expression.

FIG. 3 is a block diagram depicting an embodiment of a change record including an annotated DDL expression. Change record 300 describes an operation and/or transaction performed on a source database, such as by source database server 102. The operation and/or transaction includes one or more DDL instructions. In one embodiment, change record 300 is a logical change record ("LCR") associated with a DDL statement executed and/or committed on the source database.

Change record 300 includes DDL expression text 302 and annotation set 304. DDL expression text 302 corresponds to the DDL statement executed and/or committed on the source database. DDL expression text 302 includes one or more components. The components may be selected from database object types of the source database, including schema names, object names, column names, table space names, partition names, or any other database object type. Although DDL expression text 302 and annotation set 304 are shown as elements of change record 300, DDL expression text 302 and/or annotation set 304 may also be generated or stored separately. In one embodiment, the components include a ROOT component.

In the example DDL expression text "CREATE TABLE scott.emp (empno number, empname varchar2)", the following are components:
ROOT;
scott;
emp;
empno; and
empname.

Annotation set 304 includes one or more annotations 306 for one or more of the components of DDL expression text 302. Each annotation includes data about a component of DDL expression text 302. The data includes hierarchical data, such as data describing a hierarchical relationship between one or more components in the DDL expression. In one embodiment, each component appearing in DDL expression text 302 is annotated. Alternatively, a subset of the components appearing in DDL expression text 302 may be annotated. In one embodiment, the annotation 306 for each annotated component includes component ID 308, component position 310, component type 314, and parent component ID 316. In one embodiment, annotation 306 further includes component length 312.

Component ID 308 is a unique identifier for a component in the annotation set 304. For a ROOT component, component ID 308 may be set to "ROOT" or any other value indicating that the component is a ROOT component.

Component position 310 indicates a position of the component in DDL expression text 302. For example, component position 310 may indicate the index of the component in a string representation of DDL expression text 302. For a ROOT component, component position 310 may be set to −1 or any other value indicating that the ROOT component is a ROOT component that does not have a component position 310 in DDL expression text 302.

Component length 312 indicates a length of the component in DDL expression text 302. For example, component length 312 may indicate the number of characters in a string representation of the component name. For a ROOT component, component length 312 may be set to −1 or any other value indicating that the ROOT component is a ROOT component that does not have a component length that corresponds to a named database object.

Component type 314 indicates a database object type of the component, such as schema, table, column, table space, partition, or any other database object type. For a ROOT component, parent type 314 may be set to NULL, −1, or any other value that indicates that the ROOT component does not correspond to a database object type.

Parent component ID 316 indicates a parent database object ID of the component appearing in the DDL. For a ROOT component, parent component ID 316 may be set to NULL, −1, or any other value that indicates that no parent component exists for the ROOT component.

In the preceding example, the following annotations are made for the following components:
ROOT: [component_ID=1] [component_position=−1] [component_length=−1] [component_type=none] [parent_component_ID=−1];
scott: [component_ID=2] [component_position=13] [component_length=5] [component_type=schema] [parent_component_ID=1];
emp: [component_ID =3] [component_position=19] [component_length=3] [component_type=table] [parent_component_ID=2];
empno: [component_ID=4] [component_position=24] [component_length=5] [component_type=column] [parent_component_ID =3];
empname: [component_ID=5] [component_position=38] [component_length=5] [component_type=column] [parent_component_ID =3];

The proceeding example shows a simple serialization of the annotation set and its corresponding hierarchical structure. The hierarchical structure and data contained in annotation set 304 may be stored and/or serialized in any manner, including existing formats such as Extensible Markup Language ("XML"), JavaScript Object Notation ("JSON"), C-structure, and any other suitable format.

Annotation 306 may further include component section 318. For example, component section 318 may be selected from a DDL object section (e.g. the object on which the DDL is executed), a dependent objects section (e.g. objects on which the DDL is dependent, such as objects appearing in a select-from of a CTAS instruction), and a storage section (e.g. a table space). In the example DDL expression text "Create table scott.tab1 as select * from system.tab1, system.tab2," "scott.tab1" belongs to a DDL object section, and "system.tab1" and "system.tab2" belong to a dependent objects section.

6. DDL Annotation Process

Figure 4:
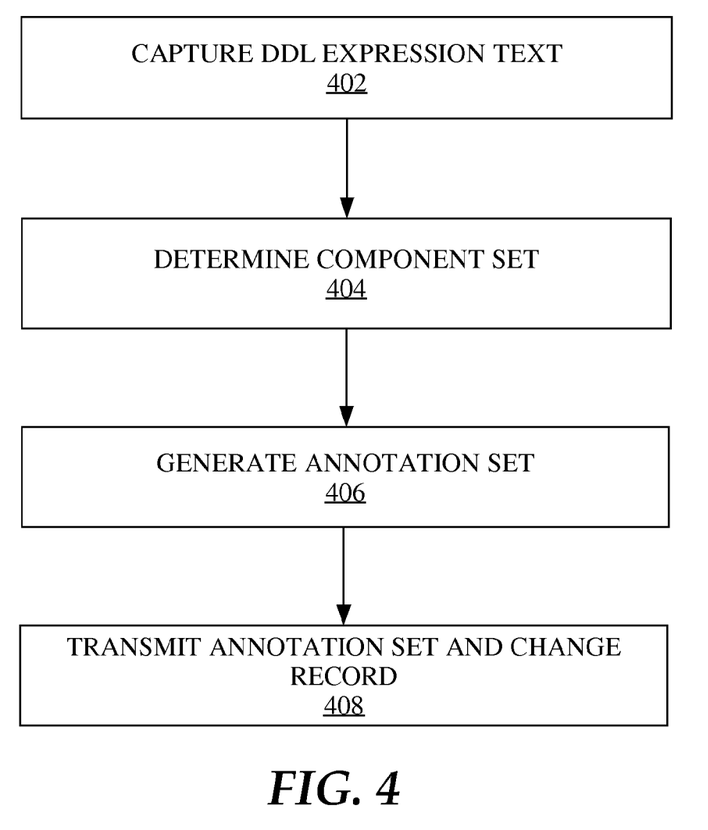
FIG. 4 is a flowchart illustrating an embodiment of a method for performing DDL expression annotation.

FIG. 4 is a flowchart illustrating an embodiment of a method for performing DDL expression annotation.

At block 402, DDL expression text is captured. The DDL expression text corresponds to a DDL change in a source database. In one embodiment, the DDL expression text is captured by a source database server, such as source database server 102. The DDL expression text may be captured when an operation and/or transaction containing DDL instructions is executed and/or committed by the source database server.

At block 404, a component set is determined. The component set includes at least one component in the DDL expression text. In one embodiment, the component set is determined by an extraction client associated with the source database server, such as extraction client 104. The components may be selected from schema names, object names, column names, table space names, partition names, or any other database object type. The DDL expression text may be annotated completely such that each component of the DDL expression text is included in the component set. Alternatively, a subset of the components of the DDL expression text may be included in the component set. For example, the subset may be selected by one or more rules specified by a user, application, file, and/or any other method for specifying a subset of components for annotation. In one embodiment, the subset is based on a custom annotation list specific to a particular replication client.

At block 406, an annotation set is generated. The annotation set includes at least one annotation for at least one component of the component set. Each annotation includes a component ID, a component position in the DDL expression text, a component type, and a parent component ID. The components in the DDL expression may have a hierarchical relationship in the source database. The parent component ID reflects the hierarchical relationship.

At block 408, the annotation set and a change record are transmitted. For example, the annotation set and the change record may be transmitted to a replication client, either directly or by outputting the replication data in an intermediary form, such as intermediary 108. The replication client may be configured to perform annotation-based mapping of a source database object to a target database object based on the annotation set. The replication client may also be configured to perform annotation-based filtering of the change record.

7. Hardware Overview

Figure 5:
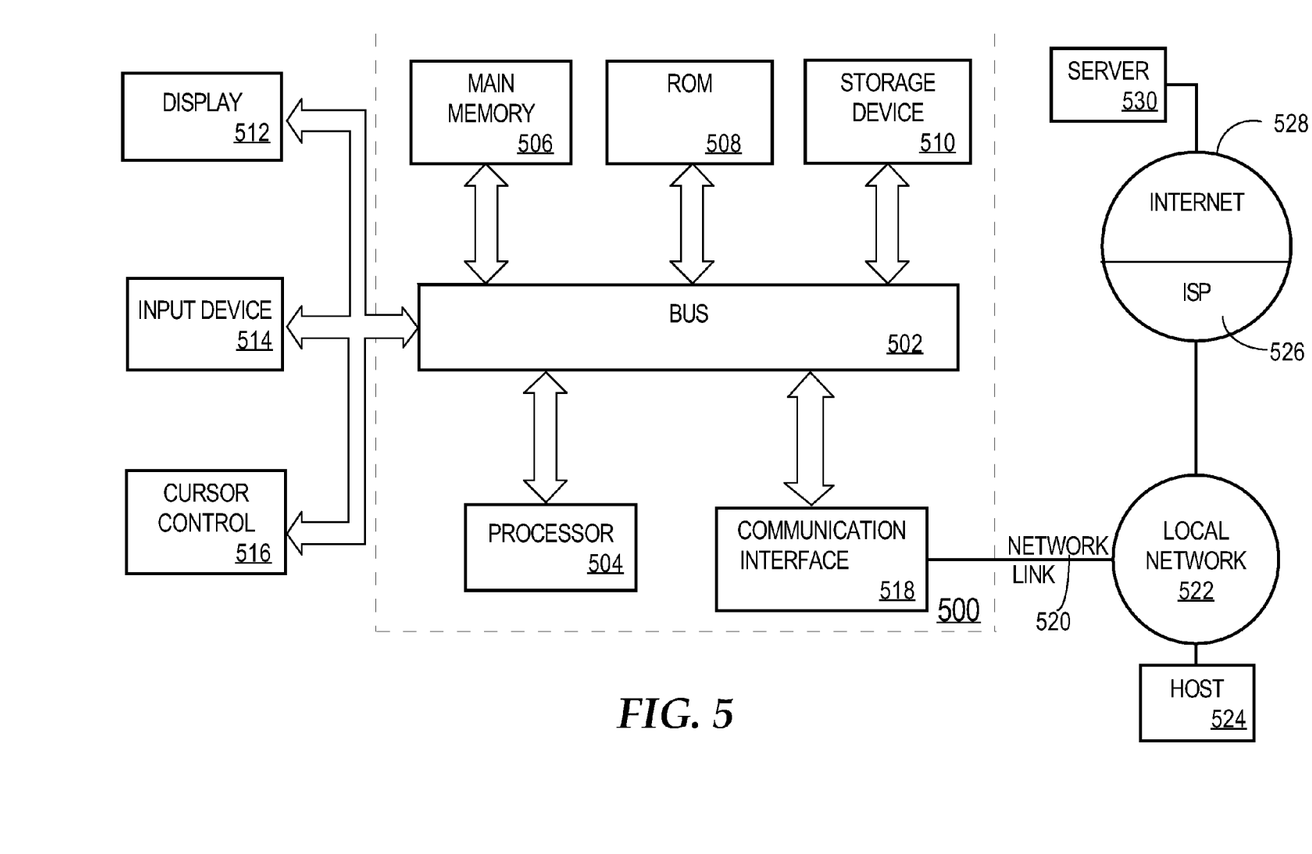
FIG. 5 illustrates a computer system upon which one or more embodiments may be implemented.

FIG. 5 illustrates a computer system upon which one or more embodiments may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502.

Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

8. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   capturing data definition language (DDL) expression text corresponding to a DDL instruction executed on a source database;
   determining a component set comprising at least one component of text in the DDL expression text;
   generating an annotation set comprising at least one annotation for at least one component of the component set, the at least one annotation comprising hierarchical data describing at least one hierarchical relationship in the component set;
   adding, to replication data, the annotation set and a change record corresponding to the DDL instruction executed on the source database;
   wherein the method is performed by one or more computing devices.

2. The method of claim 1, further comprising transmitting the annotation set and the change record to a replication client configured to perform annotation-based mapping of a source database object to a target database object based on the annotation set.

3. The method of claim 2, wherein the replication client is configured to perform annotation-based filtering on the change record based on the annotation set.

4. The method of claim 2, further comprising:
   obtaining a custom annotation list specific to the replication client;
   wherein only annotations for the custom annotation list are generated.

5. The method of claim 1, wherein each annotation in the annotation set comprises a component ID, a component position, a component type, and a parent component ID.

6. The method of claim 5, wherein each annotation in the annotation set further comprises a component length.

7. The method of claim 5, wherein the component type for one or more annotations in the annotation set is one of: table, column and schema.

8. The method of claim 5, wherein at least one annotation of the at least one component further comprises a component section that identifies a section of the DDL expression text, wherein the component section for one or more annotations in the annotation set is one of: a DDL object section that includes objects on which the DDL instruction is executed, a dependent objects section that includes objects on which the DDL is dependent, and a storage section that includes a table space.

9. The method of claim 1, wherein the at least one component of the component set comprises a root component.

10. The method of claim 1, wherein the change record comprises the DDL expression text.

11. A non-transitory computer storage medium storing one or more sequences of instructions which, when executed by one or more processors, cause performance of:
   capturing data definition language (DDL) expression text corresponding to a DDL instruction executed on a source database;
   determining a component set comprising at least one component of text in the DDL expression text;
   generating an annotation set comprising at least one annotation for at least one component of the component set, the at least one annotation comprising hierarchical data describing at least one hierarchical relationship in the component set;
   adding, to replication data, the annotation set and a change record corresponding to the DDL instruction executed on the source database.

12. The non-transitory computer storage medium of claim 11, wherein the one or more sequences of instructions include instructions that, when executed by the one or more processors, cause performance of transmitting the annotation set and the change record to a replication client configured to perform annotation-based mapping of a source database object to a target database object based on the annotation set.

13. The non-transitory computer storage medium of claim 12, wherein the replication client is configured to perform annotation-based filtering on the change record based on the annotation set.

14. The non-transitory computer storage medium of claim 12, wherein the one or more sequences of instructions include instructions that, when executed by the one or more processors, cause performance of:
   obtaining a custom annotation list specific to the replication client;
   wherein only annotations for the custom annotation list are generated.

15. The non-transitory computer storage medium of claim 11, wherein each annotation in the annotation set comprises a component ID, a component position, a component type, and a parent component ID.

16. The non-transitory computer storage medium of claim 15, wherein each annotation in the annotation set further comprises a component length.

17. The non-transitory computer storage medium of claim 15, wherein the component type for one or more annotations in the annotation set is one of: table, column and schema.

18. The non-transitory computer storage medium of claim 15, wherein at least one annotation of the at least one component further comprises a component section that identifies a section of the DDL expression text, wherein the component section for one or more annotations in the annotation set is one of: a DDL object section that includes objects on which the DDL instruction is executed, a dependent objects section that includes objects on which the DDL instruction is executed, and a storage section that includes a table space.

19. The non-transitory computer storage medium of claim 11, wherein the at least one component of the component set comprises a root component.

20. The non-transitory computer storage medium of claim 11, wherein the change record comprises the DDL expression text.

* * * * *

UNITED STATES PATENT AND TRADEMARK OFFICE
CERTIFICATE OF CORRECTION

PATENT NO.       : 9,171,051 B2                                  Page 1 of 1
APPLICATION NO.  : 13/949969
DATED            : October 27, 2015
INVENTOR(S)      : Raghunathan et al.

It is certified that error appears in the above-identified patent and that said Letters Patent is hereby corrected as shown below:

In the Specification
In column 5, line 11, delete "and or" and insert -- and/or --, therefor.

Signed and Sealed this
Twenty-eighth Day of June, 2016

Michelle K. Lee
*Director of the United States Patent and Trademark Office*